United States Patent [19]
Thomas

[11] Patent Number: 4,836,941
[45] Date of Patent: Jun. 6, 1989

[54] CLEAR BRINE FLUIDS

[75] Inventor: Robert C. Thomas, Midland, Mich.

[73] Assignee: The Dow Chemical Company, Midland, Mich.

[21] Appl. No.: 823,568

[22] Filed: Jan. 29, 1986

[51] Int. Cl.$^4$ .................. E21B 43/00; C09K 3/00
[52] U.S. Cl. .................. 252/8.555; 252/8.51; 252/8.551; 252/8.514; 166/244.1
[58] Field of Search .................. 252/8.5, 8.55, 391; 166/278, 244 R, 297

[56] References Cited

U.S. PATENT DOCUMENTS

| | | | |
|---|---|---|---|
| 4,292,183 | 9/1981 | Sanders | 252/8.55 R |
| 4,304,677 | 12/1981 | Stauffer et al. | 252/8.55 R |
| 4,536,302 | 8/1985 | Augsburger et al. | 252/391 |

FOREIGN PATENT DOCUMENTS 2027686 2/1980 United Kingdom.

Primary Examiner—Barry S. Richman
Assistant Examiner—T. J. Wallen
Attorney, Agent, or Firm—Joe R. Prieto; Barbara J. Sutherland

[57] ABSTRACT

A clear brine fluid composition for use in servicing wells in the oil and gas industry comprising a solution of a zinc halide and a calcium halide in water having a density lying in the range of about 15 to about 22 ppg, a measured alkalinity lying in the range of about 0 up to about 1 normal and a measured zinc to calcium mole ratio lying in the range of about 1 to about 3.

20 Claims, 2 Drawing Sheets

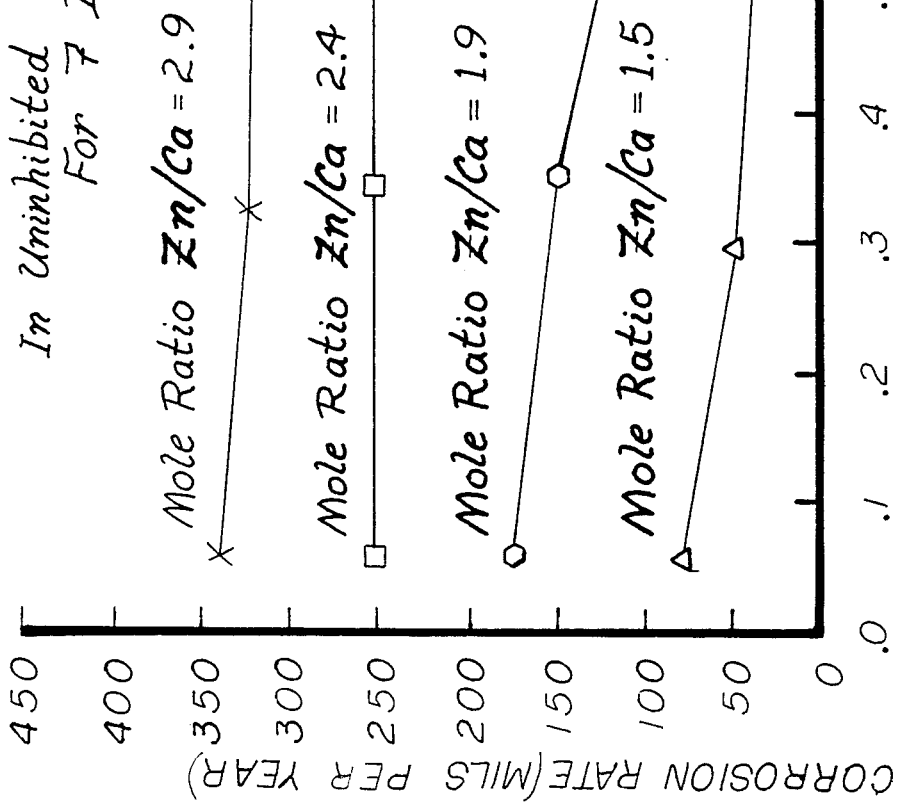

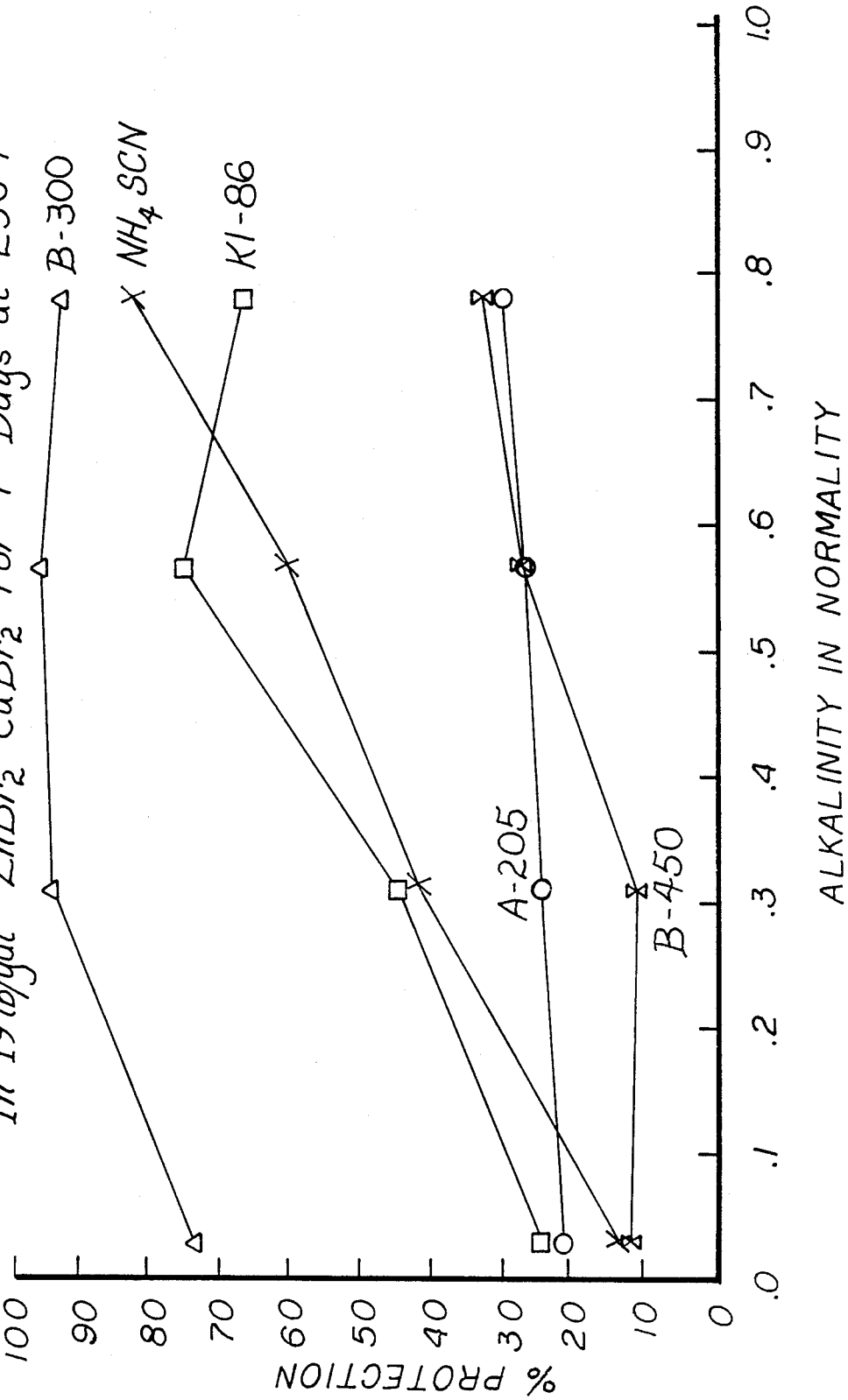

CLEAR BRINE FLUIDS

BACKGROUND OF THE INVENTION

The present invention relates to a solids-free solution adapted for use as a well-servicing fluid and a method of use therefor.

A "clear brine fluid" is a solids free solution useful for servicing wells in the oil and gas industry, for example, as a well-completion, packer, workover and drilling fluid. In recent years clear brine fluids have been used in the oil and gas industry in place of drilling muds and solids-containing well-servicing fluids. Maintaining maximum formation permeability is better assured with solids-free well-servicing fluids and thus higher production rates are achieved.

Known clear brine fluids include, for example, zinc-containing brines such as solutions of zinc chloride and calcium chloride described in U. S. Pat. No. 3,126,950 and solutions of zinc bromide and calcium bromide described in U. S. Pat. Nos. 4,248,850; 4,292,183; 4,304,677 and 4,490,262. Such zinc-containing fluids typically have a density in excess of about fifteen pounds per gallon and typically may be more corrosive than non-zinc-containing brines. Because of the considerable cost in drilling and completing oil and gas wells, it is important that a desirable clear brine fluid exhibit a minimized, if any, significant corrosion rate toward the downhole metal tubular materials. Depending on the exposure time, this generally requires corrosion rates in the range of less than fifty mils per year. Downhole conditions can include a pressure of up to 20,000 psi and a temperature of about 400° F. to 500° F.

The clear brine fluids described in the prior art above may provide some corrosion protection, however, it is desired to minimize even further the corrosion rates of the fluids by providing the fluids with particular beneficial characteristics adapted to reducing the corrosion rate of such fluids.

SUMMARY OF THE INVENTION

The present invention is directed to a composition suitable for use as a well-completion, packer, workover, or drilling fluid comprising a mixture of a zinc halide and a calcium halide in water having a density lying in the range from about 15 up to 22 pounds per gallon, a measured alkalinity in the range from about 0 up to about 1 normal, and a measured zinc to calcium mole ratio in the range from about 1 up to about 3.

BRIEF DESCRIPTION OF THE DRAWINGS

FIG. 1 is a graphic illustration comparison of corrosion, alkalinity and mole ratio of a clear brine fluid.

FIG. 2 is a graphic illustrative comparison of percent protection on steel of various commercially available inhibitors and alkalinity of a clear brine fluid. de

DETAILED DESCRIPTION OF THE PREFERRED EMBODIMENTS

Typically, clear brine fluids have densities ranging from ten or eleven pounds per gallon for materials such as sodium chloride, potassium bromide and calcium chloride to densities of twenty-two pounds per gallon for materials such as those containing high concentrations of zinc bromide. Generally, a wells bottom hole pressure, which must be equalized, determines the density of the brine needed. The freezing point or crystallization point of clear brine fluids is a function of the composition of the clear brine fluid and crystallization point is also normally specified for each individual application.

Generally, the clear brine fluids of the present invention are "high density fluids". By "high-density fluid" it is meant a substantially solids-free aqueous solution having a density of above about 14 pounds per gallon (ppg) and, preferably, about 15 ppg to about 22 ppg.

Generally, the clear brine fluids employed in the present invention are substantially solids-free aqueous solutions of at least one zinc halide and at least one calcium halide. For example, the zinc halide may include zinc chloride or zinc bromide and the calcium halide may include calcium chloride or calcium bromide. Mixtures of the halides may also be used, such as a blend of calcium bromide, calcium chloride and zinc bromide. Preferably, the clear brine fluid employed in the present invention may consist essentially of a substantially solids-free aqueous solution of calcium bromide and zinc bromide. The amount of calcium bromide and zinc bromide dissolved in the aqueous solution may vary depending on the solution's final density and crystallization point desired. As aforementioned the density of the clear brine fluid is selected to balance the downhole pressure under well use conditions, and the density of the fluid may be as high as 22 ppg.

The density of the clear brine fluid is controlled by employing varying amounts of the zinc halide and calcium halide. Methods of providing a zinc bromide/calcium bromide solids-free fluid having a density in the range of 15 to 22 pounds per gallon are described in U.S. Pat. Nos. 4,248,850; 4,292,183 and 4,304,677 all of which are incorporated herein by reference. For example, in U.S. Pat. no. 4,248,850 metal bromides are prepared from a basic metal compound and bromine in the presence of added formaldehyde as a reducing agent. In U.S. Pat. No. 4,292,183, various blends of zinc bromide and calcium bromide and water are employed to obtain a zinc bromide/calcium bromide solution having a density of 14 ppg to 18 ppg. In U.S. Pat. No. 4,304,677, an 18 ppg fluid may be obtained by reacting hydrogen bromide and a zinc or a zinc compound in the presence of water and calcium bromide.

The clear brine fluids of the present invention have a measured alkalinity lying in the range of about 0 up to about 1 normal, preferably from about 0.5 to about 1.0 normal. The alkalinity of the fluid may be measured by titration methods known in the art.

For example, one method of measuring the alkalinity of the clear brine fluids is by titrating a known amount of the fluid with a strong acid such as hydrochloric acid (HCl) or hydrobromic acid (HBr) until the equivalence point of the fluid is reached. The fluid may be diluted at a ratio of 1:10 with water prior to carrying out the alkalinity measurement. For example, a 25 milliliter sample of the clear brine fluid is diluted to 250 milliliters with distilled water in a 400 milliliter beaker. An X-Y recorder is then used to plot the pH of the diluted fluid versus the amount in milliliters (ml) of 1.00 normal (N) hydrochloric acid added to the fluid. The alkalinity in normality may be calculated according to the following equation:

alkalinity in normality = ml. of 1.0 N HCl required for a 25 ml. sample/25

The alkalinity of the clear brine fluid may be adjusted by adding alkaline materials such as oxides and hydroxides of calcium and zinc. To maintain the solution's zinc to calcium (zinc/calcium) mole ratio when adding alkaline materials, the alkaline materials must be added in the same zinc/calcium mole ratio.

In the prior art, pH is a common measure of alkalinity of some aqueous solutions. However, the values obtained when measuring the pH of clear brine fluids can be misleading. In dilute aqueous solutions, a pH of 7 is the neutral point with lower values labeled acidic and higher values basic. Clear brine fluids may contain up to eighty percent salt and the very small amount of water present in the fluids shifts the pH, electrode response significantly. Because of the fluids low water content, pH measurements are generally carried out after diluting one volume of the clear brine fluid with nine volumes of water. Examples of such measurements on four calcium bromide-zinc bromide clear brine fluids are shown in Table I below.

TABLE I

| Compound | Density lbs/gal | pH undiluted | pH diluted 1:10 | Alkalinity normality |
|---|---|---|---|---|
| CaBr/ZnBr | 16.0 | 5.3 | 6.1 | 0.17 |
| CaBr/ZnBr | 19.3 | −0.2 | 5.6 | 0.06 |
| CaBr/ZnBr | 19.3 | 1.1 | 5.6 | 0.44 |
| CaBr/ZnBr | 19.3 | 1.4 | 5.4 | 1.02 |

Alkalinity in the form of calcium or zinc oxides or hydroxides can be added to lower the corrosivity of the clear brine fluid but even after dilution the pH of the fluid will still be less than seven. Since this added alkalinity is more soluble in the concentrated brine, it may appear as a white precipitate when diluted with water. Note in Table I that for the three 19.3 pound per gallon clear brine fluids listed, varying the alkalinity will shift the undiluted pH but not the diluted pH. For example, the pH of a lime-water slurry is constant and does not vary with the amount of lime present. Some alkalinity may be present even if a precipitate is not present.

The pH value of a clear brine fluid is one indicator of how corrosive a fluid may be, since it is generally known that the lower the pH of a solution, the greater the corrosiveness of that solution will be. However, pH alone does not indicate a fluid's corrosiveness. Thus, it is an advantage of the present invention to be able to control the alkalinity of a clear brine fluid and to provide a clear brine fluid exhibiting lower corrosive properties than the fluids of the prior art.

Another characteristic of the clear brine fluid of the present invention is that the fluid contains a zinc/calcium mole ratio lying in the range from about 1 to about 3, preferably from about 1 to about 2.

The zinc/calcium mole ratio of the clear brine fluid may be determined by titration methods known in the art. For example, one method of determining the mole ratio of the fluid is by determining the amount of zinc and calcium present in a representative portion of a sample of the fluid. For example, an aliquot of the fluid sample is added to an ammoniacal solution buffered at a pH of 10. Calcium and zinc are titrated quantitatively with a standard solution of disodium ethylenedinitrilotetraacetate (EDTA) using a metal ion indicator such as Eriochrome ® Black T. Zinc is titrated with EDTA at a pH of 10 after the calcium is precipitated with for example, sodium fluoride. Calcium is determined by the difference in the two titrations.

The zinc/calcium mole ratio of the clear brine fluid may be adjusted by adding a sufficient amount of zinc and calcium compounds soluble in the fluid to obtain the desired zinc/calcium mole ratio. The zinc and calcium compounds may be the halides of zinc and calcium such as zinc and calcium bromides or chlorides. The compounds used for adjusting the zinc/calcium mole ratio of the fluids may also include zinc and calcium oxides and hydroxides but the additions of these compounds will alter the fluid's alkalinity and, thus, the appropriate amounts must be added to the fluid to obtain the desired zinc/calcium mole ratio and the desired alkalinity value of the fluid.

It is important in the present invention to maintain the fluid density, alkalinity level, and zinc/calcium mole ratio of the clear brine fluid within the ranges discussed above to provide a clear brine fluid having enhanced corrosion protection toward metals.

The clear brine fluids of the present invention may contain other water-soluble materials in amounts less than that which would adversely affect the utility of the fluid. Such materials include, for example, an effective amount of organic and inorganic corrosion inhibitors, thickening agents such as hydroxyethylcellulose, and weighting agents such as sodium and potassium chlorides and bromides. For example, any well known or commercially available corrosion inhibitors may be added to the clear brine fluid of the present invention to further enhance the corrosion protection of the fluid. Corrosion inhibitors useful in the present invention include for example ammonium thiocyanate. Preferably an effective amount of inhibitor is used and more preferably from about 0 to about 5000 parts per million is used.

The zinc bromide/calcium bromide fluid prepared in accordance with the present invention may be employed in servicing wells such as found in the oil and gas industry. The fluid is particularly useful as a well completion, packer, workover or drilling fluid. The techniques and equipment employed for servicing the wells are well known in the art. Examples of well-servicing techniques where the fluid of the invention may be employed are taught, for example, in U.S. Pat. Nos 2,894,584; 2,898,294; and 3,126,950. The teachings of these patents are specifically incorporated herein by reference.

The following examples further illustrate the invention, but should not be construed as limiting the scope of the invention.

EXAMPLE 1

In this example the zinc/calcium mole ratio and alkalinity of a clear brine fluid was varied to determine the effect of zinc/calcium mole ratio and alkalinity on the corrosiveness of the fluid.

A sample of a zinc bromide/calcium bromide fluid having a density of 19 ppg was analyzed and found to contain a zinc/calcium mole ratio of 2.5 with an alkalinity of 0.4 normal. Approximately 12,000 grams of the fluid was placed into four separate containers. The initial weight of each of the four fluid samples and the results of the materials added to each container are described below in Table II.

TABLE II

| Sample Container Number | Initial Weight of Solution (grams) | ZnBr$_2$ Added (grams) | CaBr$_2$ Added (grams) | H$_2$O Added (grams) | ZnO Added (grams) | CaOH$_2$ Added (grams) |
|---|---|---|---|---|---|---|
| 1 | 11,800 | 1368 | — | 500 | 125.6 | 40.8 |
| 2 | 13,700 | — | — | — | 120.2 | 46.6 |
| 3 | 12,100 | — | 680 | 250 | 106.9 | 51.2 |
| 4 | 10,200 | — | 1370 | 500 | 90.3 | 54.8 |

The above procedure completed the zinc/calcium molar adjustments and increased the alkalinity of all the fluid samples. The contents were mixed by placing the containers on a drum roller. After mixing, the contents were filtered to remove insolubles. Each of the four samples were then divided into four parts (A through D). Table III below describes the fluid samples and the materials added to the samples to adjust the fluids alkalinity.

TABLE III

| Sample Number | Solution (Grams) | 48% HBr (ml) | 62% HBr (ml) | H$_2$O (ml) | Final Density (ppg) | Alkalinity (Normality) | Mole Ratio (Zinc/calcium) | Corrosion Rate (mils per year) |
|---|---|---|---|---|---|---|---|---|
| 1A | 3275 | 7 | 107 | 33 | 19.3 | 0.06 | 2.85 | 340 |
| 1B | 3405 | 114 |  | 20 | 19.3 | 0.33 | 2.85 | 322 |
| 1C | 3538 | 40 |  |  | 19.2 | 0.64 | 2.86 | 315 |
| 1D | 3571 |  |  | 100 | 19.3 | 1.02 | 2.87 | 229 |
| 2A | 3569 |  | 117 |  | 19.3 | 0.06 | 2.40 | 254 |
| 2B | 3615 | 122 |  |  | 19.3 | 0.34 | 2.39 | 253 |
| 2C | 3561 | 42 |  | 80 | 19.2 | 0.68 | 2.39 | 252 |
| 2D | 3610 |  |  | 100 | 19.2 | 1.02 | 2.41 | 184 |
| 3A | 3343 |  | 110 |  | 19.3 | 0.06 | 1.94 | 174 |
| 3B | 3363 | 114 |  |  | 19.3 | 0.35 | 1.94 | 146 |
| 3C | 3158 | 55 |  | 50 | 19.2 | 0.67 | 1.94 | 93 |
| 3D | 3445 |  |  | 88 | 19.3 | 1.04 | 1.88 | 83 |
| 4A | 2953 | 4 | 90 | 36 | 19.3 | 0.06 | 1.52 | 78 |
| 4B | 2914 | 88 |  | 25 | 19.3 | 0.32 | 1.52 | 49 |
| 4C | 2873 | 39 |  |  | 19.3 | 0.69 | 1.53 | 25 |
| 4D | 2800 |  |  | 90 | 19.3 | 0.96 | 1.48 | 32 |

The corrosiveness of each of the fluid samples was tested as follows: A 231 gram sample of each fluid sample was placed in a separate 4 ounce glass bottle. N-80 steel corrosion test coupons were cut from a 2½ inch O.D. pipe. A 1 inch wide ring was first cut and then divided into 4 parts. The coupons were then tumbled with an aluminum oxide abrasive to remove most of the pipe mill scale. The coupons were then cleaned and lightly oiled to retard corrosion before use. Before the corrosion test of each coupon, the coupon was cleaned in acetone, dried and weighed to the nearest 0.1 milligram. The coupon was placed inside the bottle with the test solution and heated in an oven at 250° F. for 168 hours. The bottle was then removed from the oven and allowed to cool. Then the coupon was removed from the bottle, rinsed and scrubbed with a soft bristle brush using water. The coupon was then cleaned by soaking the coupon for 10 minutes in 5 percent hydrochloric acid inhibited with 0.1 percent of a corrosion inhibitor. After soaking the coupons, the coupon was rinsed with water and scrubbed with the bristle brush. Acetone was used to thoroughly dry the coupon before the final weight of the coupon was taken. Since the coupon had a surface area of 4.19 square inches, the difference in coupon weights in grams was multiplied by 96.9 to obtain the corrosion rate in mils (0.001 inches) per year. The corrosion rates of each of the samples are listed in Table III and plotted in FIG. 1.

EXAMPLE 2

Example 2 was carried out to determine the effectiveness of various corrosion inhibitors in the clear brine fluids of the present invention. A sample of a zinc bromide/calcium bromide fluid having a density of 19.9 ppg was analyzed and found to contain a zinc/calcium mole ratio of 2.4 and an alkalinity of 0.4 normal. Then 11.2 grams of CaO and 95.1 grams of ZnO was added to 5.7 liters of the fluid. The mixture was stirred for several days to increase the fluid's alkalinity. The insolubles in the fluid were allowed to settle and were separated from the clear portion by decantation. The clear portion was then divided into four 1420 milliliter portions labeled 1 through 4. An amount of 48 percent hydrogen bromide (HBr) was added to each of the samples. Then the alkalinity and the density of each sample was determined. Table IV below describes the amounts of 48 percent HBr added to each of the four samples and the resultant alkalinity and density of each of the sample after addition of the HBr.

TABLE IV

| Sample | 48 Percent HBr (ml) | Alkalinity (Normality) | Density (ppg) |
|---|---|---|---|
| 1 | 120 | 0.03 | 18.8 |
| 2 | 74 | 0.31 | 19.0 |
| 3 | 32 | 0.57 | 19.2 |
| 4 | none | 0.78 | 19.3 |

The corrosiveness of the fluids was tested as follows: A 250 grams sample portion of each of the four fluid samples was placed into six separate 4 ounce glass bottles. The five inhibitors described in Table V below were weighed to the nearest milligram and then added to five of the six bottles. Each bottle was capped, shaken and if the inhibitor was not dissolved in solution, the bottle was heated briefly at 250° F. until the inhibitor dissolved to ensure that the inhibitor was totally in solution. Then 1010 steel coupons with dimensions of 1 inch x 3 inch x 0.061 inch were cleaned in acetone, dried and weighed to the nearest 0.1 milligram. A coupon was then placed inside each of the bottles, thereafter, the bottle was capped. The bottle was then heated in an oven at 250° F. for 168 hours. The bottle was then removed from the oven and allowed to cool. Then the coupon was removed from the bottle, rinsed and scrubbed with a soft bristle brush using water. The coupon was then cleaned by soaking for 10 minutes in 5 percent hydrochloric acid inhibited with 0.1 percent corrosion inhibitor. After soaking, the coupon was rinsed with water and scrubbed with the bristle brush. Acetone was used to thoroughly dry the coupon before the final weight of the coupon was taken. Since the coupon had a surface area of 6.18 square inches, the coupon weight difference was multiplied by 65.5 to obtain the corrosion rate in mils (0.001 inches) per year (MPY). The percent protection of each of the samples was determined by the following formula:

$$\frac{\text{Percent}}{\text{Protection}} = \frac{(MPY(\text{uninhibited}) - MPY(\text{inhibited})) \times 100}{MPY(\text{uninhibited})}$$

The results are shown in Table V and plotted in FIG. 2.

TABLE V

| Solution Number | Inhibitor | Inhibitor ppm | Corrosion Rate MPY | Percent Protection |
|---|---|---|---|---|
| 1A | none | 0 | 214 | 0 |
| 2A | none | 0 | 175 | 0 |
| 3A | none | 0 | 153 | 0 |
| 4A | none | 0 | 135 | 0 |
| 1B | NH4SCN | 399 | 185 | 13 |
| 2B | NH4SCN | 399 | 101 | 42 |
| 3B | NH4SCN | 399 | 60.9 | 60 |
| 4B | NH4SCN | 399 | 24.4 | 82 |
| 1C | KI-86[1] | 386 | 159 | 25 |
| 2C | KI-86 | 383 | 97.4 | 44 |
| 3C | KI-86 | 399 | 37.6 | 75 |
| 4C | KI-86 | 410 | 46.3 | 66 |
| 1D | A-205[2] | 411 | 166 | 22 |
| 2D | A-205 | 414 | 133 | 24 |
| 3D | A-205 | 411 | 113 | 26 |
| 4D | A-205 | 419 | 96.5 | 29 |
| 1E | B-300[3] | 382 | 53.4 | 75 |
| 2E | B-300 | 387 | 10.3 | 94 |
| 3E | B-300 | 387 | 8.4 | 95 |
| 4E | B-300 | 391 | 10.4 | 92 |
| 1F | B-450[4] | 502 | 188 | 12 |
| 2F | B-450 | 470 | 156 | 11 |
| 3F | B-450 | 498 | 113 | 26 |
| 4F | B-450 | 483 | 93.8 | 31 |

[1]KI-86 is a solution of amine salts, oxyalkylated phenols and oxyalkylated amines in water, methanol and isopropanol. KI-86 is commercially available from the Tretolite Company, a division of Petrolite Corporation.
[2]Corban 333 Corrosion Inhibitor A 205. The inhibitor is an organic nitrogen compound and ammonium salt in isopropanol and was commercially obtained from the Dowell Division of Dow Chemical Company U.S.A., Tulsa Okla. The Dowell Division is now Dowell-Schlumberger Corp.
[3]Baracor ® 300 corrosion inhibitor is a blend of a quaternary ammonium compound and surfactants and is commercially available from NL Industries, Inc. Houston, Texas.
[4]Baracor ® 450 corrosion inhibitor is a cyanogen based inorganic compound and is commercially available from NL Industries, Inc. Houston, Texas.

Although the invention has been described in considerable detail, it must be understood that such detail is for the purpose of illustration only and that many variations and modifications can be made by one skilled in the art without departing from the intent and scope of the invention.

What is claimed is:
1. A composition comprising a solution of a zinc halide and a calcium halide in water having a density from about 15 to about 22 pounds per gallon, an alkalinity from about 0.5 to about 1 normal, and a measured zinc to calcium mole ratio from about 1 to about 3.
2. The composition of claim 1 wherein the zinc halide is zinc bromide and the calcium halide is calcium bromide.
3. The composition of claim 1 wherein the solution includes further a corrosion inhibitor.
4. The composition of claim 3 wherein the amount of corrosion inhibitor is from about 1 to about 5000 parts per million by weight.
5. The composition of claim 3 wherein the corrosion inhibitor is ammonium thiocyanate.
6. A method of reducing the corrosiveness of a solution of a calcium halide and a zinc halide in water at a density from about 15 to about 22 pounds per gallon comprising balancing the alkalinity of the solution at a level from about 0.5 to about 1 normal and the zinc to calcium mole ratio in a range from about 1 to about 3.
7. The method of claim 6 wherein the zinc halide is zinc bromide and the calcium halide is calcium bromide.
8. The method of claim 6 wherein the solution includes further a corrosion inhibitor.
9. The method of claim 8 wherein the amount of corrosion inhibitor is from about 1 to about 5000 parts per million by weight.
10. The method of claim 8 wherein the corrosion inhibitor is ammonium thiocyanate.
11. A method of preparing a fluid adapted for use as a well completion, packer, work-over and drilling fluid comprising admixing a sufficient amount of a zinc halide and a calcium halide in the presence of water to form an aqueous solution of a zinc halide and a calcium halide having a density from about 15 to about 22 pounds per gallon, an alkalinity from about 0.5 to about 1 normal, and a zinc to calcium mole ratio from about 1 to about 3.
12. The method of claim 11 wherein the zinc halide is zinc bromide and the calcium halide is calcium bromide.
13. The method of claim 11 wherein the solution includes further a corrosion inhibitor.
14. The method of claim 13 wherein the amount of corrosion inhibitor is from about 1 to about 5000 parts per million by weight.
15. The method of claim 13 wherein the corrosion inhibitor is ammonium thiocyanate.
16. A method of servicing a well bore comprising introducing into the well bore a fluid comprising a solution of a zinc halide and a calcium halide in water having a density from about 15 to about 22 pounds per gallon, an alkalinity from about 0.5 to about 1 normal, and a zinc to calcium mole ratio from about 1 to about 3.
17. The method of claim 16 wherein the zinc halide is zinc bromide and the calcium halide is calcium bromide.
18. The method of claim 16 wherein the solution includes further a corrosion inhibitor.
19. The method of claim 18 wherein the amount of corrosion inhibitor is from about 1 to about 5000 parts per million by weight.
20. The method of claim 18 wherein the corrosion inhibitor is ammonium thiocyanate.

* * * * *

UNITED STATES PATENT AND TRADEMARK OFFICE
CERTIFICATE OF CORRECTION

PATENT NO. : 4,836,941

DATED : June 6, 1989

INVENTOR(S) : Robert C. Thomas

It is certified that error appears in the above-identified patent and that said Letters Patent is hereby corrected as shown below:

Column 1, line 56, "de" at the end of the line should be --deleted--.

Column 8, line 5, delete the word "measured".

Signed and Sealed this

Twenty-second Day of May, 1990

Attest:

HARRY F. MANBECK, JR.

*Attesting Officer*      *Commissioner of Patents and Trademarks*